Nov. 17, 1959     E. A. HANYSZ     2,912,853
ULTRASONIC TRANSMISSION TESTING METHOD
Filed April 18, 1955
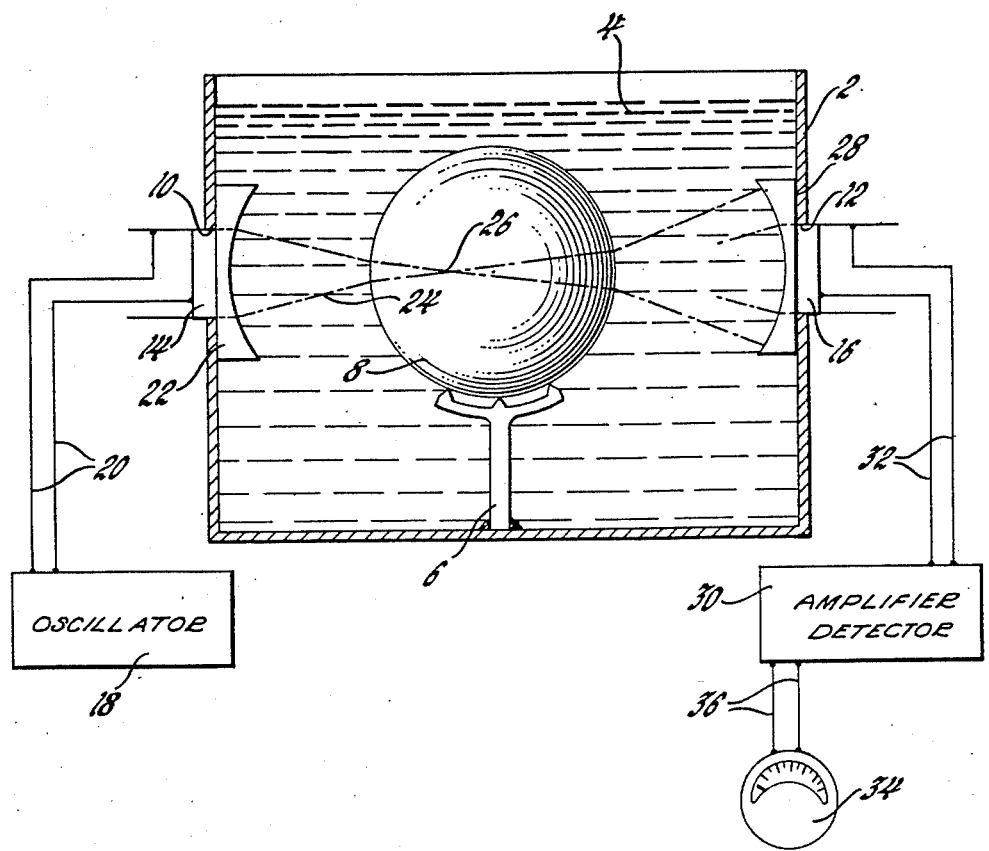
Inventor
Eugene A. Hanysz
By L. D. Burch
Attorney 
United States Patent Office 2,912,853
Patented Nov. 17, 1959

2,912,853

ULTRASONIC TRANSMISSION TESTING METHOD

Eugene A. Hanysz, Royal Oak, Mich., assignor to General Motors Corporation, Detroit, Mich., a corporation of Delaware Application April 18, 1955, Serial No. 502,038

1 Claim. (Cl. 73—67.6)

This invention relates generally to ultrasonic transmission test equipment and more particularly to such equipment as used for inspection purposes to detect flaws and imperfections within articles of manufacture.

Ultrasonic transmission inspection devices have been used in the past for detecting irregularities within and on the surface of articles of manufacture. Such inspection devices make use of high frequency sound waves transmitted as beams or rays of energy through a test member to a receiving means. Energy losses in transmitting the ultrasonic waves through the test member occasioned by the deflection or scattering of energy rays by irregular surfaces and the losses in passing energy rays through an air pocket, providing a solid to air interface, are perceptible by the receiver means to indicate the presence of all defects. The larger the work member imperfection is the more rays affected, the greater the energy loss, and the more perceptible the flaw.

Many articles of manufacture require the detection of very minutes flaws which are not readily perceptible by present ultrasonic inspection devices. For example, spherical balls used in ball bearing assemblies must be accurately inspected for both surface and internal flaws since the life of each bearing assembly is dependent upon the least perfect ball bearing member.

It is now proposed to provide an ultrasonic transmission inspection method which provides greater sensitivity to the detection of flaws and imperfections to detect more minute flaws and imperfections than heretofore perceptible and with greater average sensitivity to both internal and surface flaws. It is further proposed to provide an ultrasonic transmission inspection method particularly adaptable for inspecting spherical objects for both internal and external flaws.

It is here proposed to utilize the focusing or beaming characteristics of ultrasonic sound waves to concentrate a greater amount of ultrasonic energy over a smaller area. It is proposed to make use of lens means for converging or focusing ultrasonic energy waves within a test member so that smaller flaws will intercept more energy waves than they would otherwise intercept. It is still further proposed to provide means for focusing or converging ultrasonic energy rays upon a point within a test member so that the average concentration of wave energy will be greater within the test member.

Means are also proposed for adapting ultrasonic transmission inspection devices to the more proficient inspection of spherical objects. The focusing of transmitted energy waves upon a point midway between the surface and the center of a spherical member permit both internal and external imperfections to be equally perceptible and rotation of the member through $4\pi$ steradians enables all such imperfections to be located.

In the drawing there is shown a diagrammatic view of of a test device embodying the principles of this invention.

Referring more particularly to the drawing, there is shown a container 2 having a liquid 4 disposed therein which is capable of transmitting ultrasonic waves. A workpiece holder 6 is provided within the container 2 for holding the spherical workpiece 8 substantially centered within the container. Openings 10 and 12 are provided through opposite sides of the container 2 for receiving therewithin ultrasonic transducers 14 and 16 respectively. The openings 10 and 12 formed within the container 2 are disposed beneath the surface of the liquid 4 and are substantially aligned with the center of the spherical test piece 8.

A high frequency oscillator 18, which may be of any well-known type such as, for example, a radio-frequency oscillator, is connected by leads 20 to the ultrasonic transducer 14. The transducer 14 may be any of a number of conventionally known ultrasonic transmitter means and is here shown as an X-cut quartz crystal capable of being excited by the output of the oscillator 18 for producing longitudinal rays or beams of ultrasonic energy. The natural piezoelectric properties of quartz cause the thickness of the crystal to vary in response to the high frequency voltage potential applied to its faces thereby producing the intense ultrasonic sound waves.

A plano-concave lens 22 is disposed within the fluid 4 and over the transducer 14, hereafter referred to as the transmitter, for concentrating the ultrasonic energy into a converging beam 24. The spherical test piece 8 is oriented with respect to the transmitter 14 so that the theoretical crossover or focal point of the ultrasonic waves 24, after refraction from the surface of the spherical test piece, will be approximately one-half of the distance or radius to the center of the spherical test piece, as indicated at 26.

A second plano-concave lens 28 is disposed within the container 2, beneath the surface of the fluid 4 and over the opening 12 and against the face of transducer 16. The ultrasonic waves emerging from the test piece 8 are received by the lens 28. Only that portion of the ultrasonic energy received by the central portion of the lens is imposed upon the transducer 16.

Signal amplifying means 30 are connected by leads 32 to the transducer 16 and an indicator or meter 34 is connected by leads 36 to the amplifier 30. The amplifier is used to amplify the electrical energy received by the transducer 16 to a level sufficient to give usable meter readings. The meter is calibrated to the percentage of sound energy transmitted through the container 2 to the receiver transducer 16.

The receiver transducer 16 converts the mechanical energy of the ultrasonic sound waves back into electric energy in the reverse manner in which the transmitter 14 converted electrical energy into ultrasonic sound waves.

In operation, the spherical test piece 8 is placed between the transmitter and receiver crystals 14 and 16 and directly in the path of the ultrasonic sound or energy wave 24 to be beamed therebetween. The total energy received by crystal 16 through the test piece will be less than would be received through the liquid alone due to losses between the liquid-solid interfaces of the workpiece. However, any flaw on the surface of the workpiece will affect the energy wave received and intersected thereby, as will any internal imperfection such as a slag pocket, and any air pocket intersected will present a solid-air interface which will reduce the energy passing therethrough.

A very small flaw on the surface or within the test piece will normally affect only a very few rays or beams of ultrasonic wave energy and may not appreciably alter the percentage of energy expected at the receiver 16. However, with the use of the lens means 22 the ultrasonic energy is concentrated upon a smaller area and consequently, the intersection thereof by any flaw will be of more wave energy and the percentage deflected or lost will be greater and more readily apparent at the meter 34.

The use of lens means to focus ultrasonic wave energy at the center of the test member will cause a flaw intersecting the energy rays near the center of the test member to be more apparent than a flaw of the same size disposed a greater radial distance from the focal point since more energy rays will be intersected near the center where the energy concentration is greater. Such a focusing arrangement, however, permits scanning a greater portion of the test member at any one moment.

With the ultrasonic wave energy focused upon the surface of a test member, there would be more effective detection of surface flaws and imperfections near the surface. Surface focus scanning allows inspection of only a small area at a time. However, an arrangement of a plurality of transmitter and receiver crystals and lens means may be employed.

In the inspection of spherical members the focusing point is preferably disposed midway to the center of the test member. This permits an optimum concentration of wave energy within the spherical member and greater sensitivity to both internal and external defects. Those imperfections on the far side of the center of the spherical test member, that would be the receiver side in the drawing, will intersect less energy rays since the rays are divergent on that side. However, rotation of the spherical member through $4\pi$ steradians will permit all defects to be detected with the greatest average sensitivity.

The size and shape of the test member as well as the type of flaw under observation will prescribe the best focal arrangement to use, the number of transmitters and receivers to be employed and the relative workpiece rotation necessary for adequate inspection. The focusing means here proposed may also be adapted for radial scanning either alone or in conjunction with rotational scanning; for example, by providing relative linear movement between the lens means and the ultrasonic energy transmitter.

I claim:

An improved method of ultrasonic wave transmission inspection which includes transmitting ultrasonic wave energy through an article of manufacture, concentrating said wave energy upon a point located one-half of the distance between the surface and the center of said article of manufacture, receiving said ultrasonic wave energy on the opposite side of said article from the transmission means, measuring the amplitude of the wave energy received through said article to detect flaws and imperfections in said article, and rotating said article to give complete internal and external inspection thereof.

References Cited in the file of this patent

UNITED STATES PATENTS

| | | |
|---|---|---|
| 2,378,237 | Morris | June 12, 1945 |
| 2,477,246 | Gillespie | July 26, 1949 |

FOREIGN PATENTS

| | | |
|---|---|---|
| 48,400 | Netherlands | May 15, 1940 |
| 470,583 | Canada | Jan. 2, 1951 |
| 853,831 | Germany | Oct. 27, 1952 |